(12) United States Patent
Pick

(10) Patent No.: US 10,753,345 B1
(45) Date of Patent: Aug. 25, 2020

(54) SLEEVE FOR SHAPE-MEMORY ALLOY

(71) Applicant: Dean Pick, Vancouver (CA)

(72) Inventor: Dean Pick, Vancouver (CA)

(*) Notice: Subject to any disclaimer, the term of this patent is extended or adjusted under 35 U.S.C. 154(b) by 0 days.

(21) Appl. No.: 16/515,766

(22) Filed: Jul. 18, 2019

(51) Int. Cl.
| | |
|---|---|
| *H01H 37/32* | (2006.01) |
| *F03G 7/06* | (2006.01) |
| *H01B 3/48* | (2006.01) |
| *H01H 61/01* | (2006.01) |
| *H01H 71/14* | (2006.01) |

(52) U.S. Cl.
CPC .............. *F03G 7/065* (2013.01); *H01B 3/485* (2013.01); *H01H 37/323* (2013.01); *H01H 61/0107* (2013.01); *H01H 71/145* (2013.01)

(58) Field of Classification Search
CPC .......... H01H 37/323; H01H 61/0107; H01H 2061/0115; H01H 2061/0122; H01H 71/145; F03G 7/065; H01B 3/47; H01B 3/48; H01B 3/485
See application file for complete search history.

(56) References Cited

U.S. PATENT DOCUMENTS

| | | | | |
|---|---|---|---|---|
| 4,806,815 A | * | 2/1989 | Honma | F03G 7/065 310/307 |
| 5,069,226 A | | 12/1991 | Yamauchi et al. | |
| 2005/0195064 A1 | * | 9/2005 | Biasiotto | H01H 61/0107 337/140 |
| 2005/0253680 A1 | * | 11/2005 | Mathews | A61M 25/0021 337/395 |
| 2005/0282444 A1 | * | 12/2005 | Irish | H01R 11/22 439/853 |
| 2006/0201149 A1 | * | 9/2006 | Biggs | H01H 1/0036 60/527 |
| 2008/0315984 A1 | * | 12/2008 | Neubauer | H01H 71/164 337/161 |
| 2014/0166452 A1 | * | 6/2014 | Colombo | H01H 3/22 200/337 |
| 2015/0292641 A1 | | 10/2015 | Kurowski et al. | |

(Continued)

FOREIGN PATENT DOCUMENTS

| | | |
|---|---|---|
| DE | 19934827 C1 | 5/2001 |
| EP | 1073081 A2 | 1/2001 |

OTHER PUBLICATIONS

AlphaWire, Customer Specification, Part No. PIF-240-20, https://www.iewc.de/assets/specsheets/Alpha%20Expand%20Sleeving%20PIF-240-20%20Spec.pdf, p. 1, Dec. 2018.

(Continued)

*Primary Examiner* — Jacob R Crum
(74) *Attorney, Agent, or Firm* — Kagan Bnder PLLC

(57) ABSTRACT

The present invention is a combination of a shape-memory alloy (SMA) element and a fiber sleeve. The SMA connects at each end to a support element, the support elements being moveable relative to each other. The fiber sleeve comprises an electrically insulating sleeve made of flexible fiber material, and is sized so that the sleeve surrounds at least a portion of the SMA element. When the SMA element is deformed upon heating or cooling, causing the support elements to move relative to each other, the fiber sleeve also deforms and continues to surround the portion of the SMA element, inhibiting the flow of electric current from the SMA element to its surroundings.

22 Claims, 4 Drawing Sheets

(56) References Cited

U.S. PATENT DOCUMENTS

2016/0093186 A1* 3/2016 Pinto, IV ............. H01H 37/323
　　　　　　　　　　　　　　　　　　　　　340/593
2016/0351291 A1* 12/2016 Turpin ................... H01B 3/301
2018/0066637 A1 3/2018 Yoo et al.
2018/0084915 A1 3/2018 Norman et al.
2018/0266400 A1 9/2018 Gurley

OTHER PUBLICATIONS

CSA Group, C22.2, 100-95, Motors and Generators, 4.7.2.1, p. 11, Jan. 1995.
CSA Group, C22.2 No. 14-13, Industrial control equipment, 4.15.21, p. 31, Mar. 2013.
TECHFIEX, Insultherm, Ultra-Flex, Technical Data Sheet, pp. 1-2, Dec. 2018.
Weimin Huang, University of Cambridge, Department of Engineering, "Shape Memory Alloys and their Application to Actuators for Deployable Structures", pp. 1-175 and cover pages, Mar. 1998.
SAES, SmartFlex® 500 µm with silicon sleeve, p. 1, Dec. 2018.
Standards catalog, UL 1441 Coated Electrical Sleeving, https://standardscatalog.ul.com/standards/en/standard_1441_4, pp. 1-2, viewed Apr. 17, 2018.

* cited by examiner

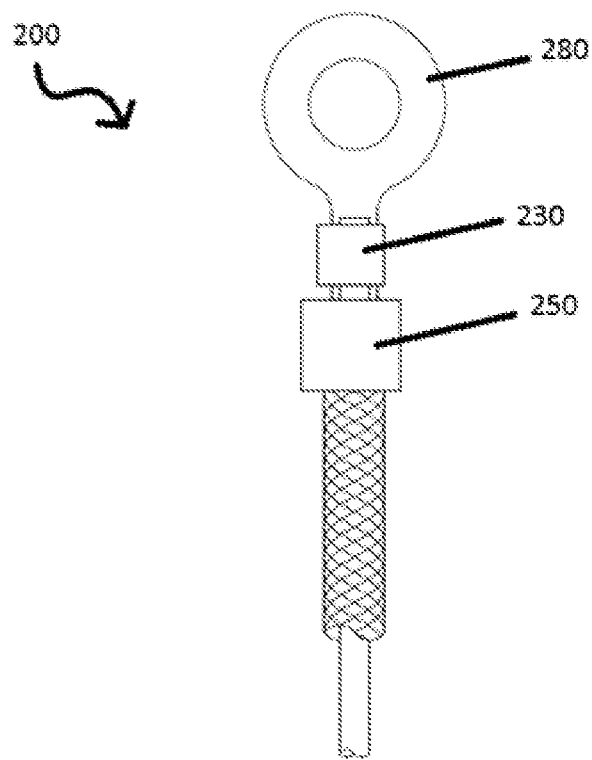
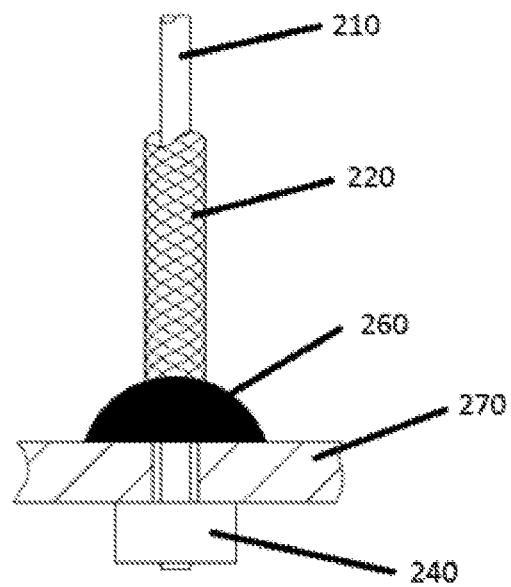
FIG. 2

SLEEVE FOR SHAPE-MEMORY ALLOY

FIELD OF THE INVENTION

The present invention relates to fiber sleeves for shape-memory alloy (SMA) elements, and to combinations of such SMA elements and fiber sleeves.

BACKGROUND OF THE INVENTION

An SMA (also referred to as a smart metal, memory metal, memory alloy, muscle wire, and smart alloy) is an alloy that "remembers" its original shape when deformed, and returns to its original shape when heated. The two main types of shape-memory alloys are copper-aluminium-nickel, and nickel-titanium (NiTi) alloys, but SMAs can also be created by alloying zinc, copper, gold and iron. Under heating, an element comprising SMA in the martensite state will start to deform at a first threshold temperature ($A_s$) and change to the austenite state by the time it reaches a second (higher) temperature ($A_f$). The SMA element in the austenite state may be contracted so that it is shorter in the austenite state than when in the martensite state. Sometimes, the SMA element in the austenite state may be twisted. The SMA element will remain in the austenite state until the SMA element is cooled below a certain threshold temperature ($M_s$), which is less than $A_f$, when it will start to return to the martensite state, and will return back to the martensite state by the time the SMA element reaches another particular temperature ($M_f$), which is generally less than $A_s$.

For example, for a NiTi SMA element, $A_s$ can be approximately 50° C., $A_f$ can be approximately 70° C., $M_s$ can be approximately 60° C., and $M_f$ can be approximately 40° C. However, the skilled person will understand that these transition temperatures can vary widely, based both on the type of alloy used in the SMA element as well as the processing of the alloy. For example, the transition temperatures for a NiTi SMA element can vary by as much as 40° C. based on processing.

Active material elements such as SMA elements are used in various devices, such as actuators and smart devices, to cause displacement of structural members of the devices by activation of the active elements. This may be done, for example, by passing current through an SMA element, thereby causing it to heat (which may be referred to as "Joule heating"), resulting in deformation of the SMA element and the application of force to the members it is attached to.

Uneven cooling or an insufficient return or biasing force may cause SMA elements to buckle and bow out of radial alignment. For example, buckling may occur in a device having multiple SMA elements in parallel if the ambient temperature around the different SMA elements varies, as this can cause some of the SMA elements to cool faster and expand while the other SMA elements remain contracted. If, as a result of buckling, SMA elements cross or touch a conductive body, this can cause a short circuit when current is passed through the SMA element.

This is illustrated in FIG. 1. FIGS. 1a, 1b, 1c and 1d are cross-sectional views of two SMA wires 100a and 100b connected to support element 110 at one end and to conductive surface 120 at the other end. FIG. 1a shows SMA wires 100a and 100b before activation. FIG. 1b shows SMA wires 100a and 100b after activation. FIG. 1c shows SMA wires 100a and 100b after activation and where wire 100a has recovered, but wire 100b has not recovered. In this case, SMA wire 100a has buckled and is touching wire 100b. FIG. 1d shows SMA wires 100a and 100b after activation and where wire 100a has recovered, but wire 100b has not recovered. In this case, SMA wire 100a has buckled and is touching conductive surface 120.

Repeated deformation of SMA elements can cause them to break, resulting in live, unsupported, SMA strands. This is particularly problematic in the case of multi-wire actuators since, even if one SMA element breaks, the presence of other SMA elements in parallel allows the actuator to continue to function, causing the live ends of the broken SMA element to be subjected to external forces and displacements. The resulting movement may increase the probability of the live ends of the broken SMA element arcing against other surfaces.

Power demands on SMA-based actuators, and in particular on multi-wire actuators, have been increasing, resulting in an increase in applied voltage and current. At high voltage and current levels, personal protection is especially important to prevent injuries, such as ventricular fibrillation, caused by contact with live parts.

Naturally occurring oxidation of the surface of SMA elements may provide a light insulative coating, however, this coating does not provide adequate protection against contact with live SMA strands, particularly for SMA strands at high voltages. In addition, the oxidative coating can often be easily removed by polishing.

While elastomer-based coatings and sheaths for SMA elements, such as those disclosed in U.S. Pat. No. 7,086,885, have been used to increase heat dissipation, lower friction, and increase biocompatibility, there are a number of problems with the use of elastomers to provide electrical insulation.

Elastomer-based coatings and sheaths are generally extruded around a wire. A thick coating may exert spring-like opposing forces that resist deformation of a coated SMA element. A thin coating tends to be relatively weak, and relies on the coated SMA element for support. Failure of the SMA element may lead to failure of the coating or sheath.

Certain elastomers, such as thermoplastic polyurethane, have low glass transition temperatures. If an elastomer is used to coat an SMA element with an activation temperature above the glass transition temperature of the elastomer, a coating or sheath made from that elastomer will tend not to withstand activation of the SMA element. This is particularly problematic for SMA elements with high activation temperatures, which are used in high temperature environments. For example, a starter motor of a car should be able to function in temperatures ranging from about −40° C. to about 125° C. Accordingly, an SMA element used in this environment should have an activation temperature above 125° C. to ensure that the SMA element only deforms when desired, and not simply due to the high temperature of its surroundings. Any coating or sheath used for such an SMA element would accordingly need to have a high glass transition temperature.

In addition, some elastomer coatings, such as ethylene propylene diene terpolymer (EPDM), restrict conductive heat transfer in fluid environments. This limits the effectiveness of any liquid heat sink used to reduce SMA element recovery time if the SMA element is coated with such an elastomer.

Furthermore, factory-applied coatings or sheaths may complicate SMA element installation and assembly, making it more difficult to route SMA elements through low clearance holes or achieve low-resistance electrical hook-up connections.

SUMMARY OF THE INVENTION

The present invention provides a combination of an SMA element and a fiber sleeve. The SMA element is made of an SMA extending from a first end to a second end. The fiber sleeve is an electrically insulating sleeve made of a flexible fiber material. The interior region of the fiber sleeve is sized to accommodate the SMA element so that the sleeve surrounds at least a portion of the SMA element. When the SMA element is heated above a first threshold temperature, the SMA element deforms. The fiber sleeve also deforms and continues to surround the portion of the SMA element. When the SMA element is subsequently cooled below a second threshold temperature the SMA element deforms. The fiber sleeve also deforms and continues to surround the portion of the SMA element. The combination is configured for use in an environment with surrounding electrical conductors so that when the SMA element undergoes Joule heating and is at a voltage potential higher than the surrounding electrical conductors, the fiber sleeve inhibits the flow of electric current from the SMA element to its surroundings. Additionally, the flexible fiber material is selected so that the fiber sleeve can withstand the first threshold temperature.

In some embodiments, a first position along a length of the SMA element is connected to a first element, and a second position along the length of the SMA element is connected to a second element, where the first and second elements are moveable relative to each other. In this embodiment, when the SMA element is heated above the first threshold temperature, the SMA element deforming causes the first and second elements to move relative to each other. Similarly, when the SMA element is subsequently cooled below the second threshold temperature, the SMA element deforming causes the first and second elements to move relative to each other.

In other embodiments, the first end of the SMA element is connected to a first support element and the second end of the SMA element is connected to a second support element, where the first and second support elements are moveable relative to each other. In this embodiment, when the SMA element is heated above the first threshold temperature, the SMA element deforming causes the first and second support elements to move relative to each other. Similarly, when the SMA element is subsequently cooled below the second threshold temperature, the SMA element deforming causes the first and second support elements to move relative to each other.

The fiber sleeve may either be secured to the SMA element proximate to the first end or attached to the first support element. Also, the fiber sleeve may either be secured to the SMA element proximate to the second end or secured to the second support element. In some embodiments, the fiber sleeve is secured to the SMA element proximate to the first end by a common crimp connection. The fiber sleeve may be secured to the second support element.

In certain embodiments, the fiber sleeve surrounds the SMA element and extends from a position proximate to the first support element to a position proximate to the second support element. The SMA element may be a wire made of the SMA.

The combination may include a second wire made of the SMA having an outer diameter substantially equal to that of the first wire. In this combination, the fiber sleeve has an inner diameter that is at least twice the outer diameter of each wire so that the two wires can be placed together in the interior region of the fiber sleeve with the fiber sleeve surrounding the two wires. The fiber sleeve extends from a position proximate to the first support element to a position proximate to the second support element.

In other embodiments, the combination may have two or more wires made of the SMA, with the wires arranged in parallel. In this embodiment, the fiber sleeve has an inner diameter dimensioned to accommodate the arrangement of the wires so that the wires can be placed together in the interior region of the fiber sleeve and the fiber sleeve surrounds the wires. The fiber sleeve extends from a position proximate to the first support element to a position proximate to the second support element.

The fiber sleeve may include closely woven or braided fiberglass.

In some embodiments, the fiber sleeve is coated to provide an impermeable membrane which prevents electrical leakage current flow in conductive environments. The coating may include an acrylic polymer, a silicone polymer or a vinyl polymer. In other embodiments, the fiber sleeve is uncoated to provide a permeable membrane that increases the heat transfer into surrounding environments.

In certain embodiments, when the SMA element is heated above the first threshold temperature, the SMA element contracts, causing the first and second support elements to move axially towards each other. In turn, the fiber sleeve contracts and continues to surround the portion of the SMA element. When the SMA element is subsequently cooled below the second threshold temperature the SMA element expands, causing the first and second support elements to move axially away from each other. In turn, the fiber sleeve expands and continues to surround the portion of the SMA element.

Preferably, if the SMA element breaks, the fiber sleeve supports the broken SMA element and continues to inhibit the flow of electric current from the SMA element to its surroundings.

The fiber sleeve may include at least one of polyethylene terephthalate fibers, aramid fibers and nylon fibers.

In some embodiments, the fiber sleeve may have end fraying prevention means.

The fiber sleeve may be dimensioned such that it remains in a compressed state whether the SMA element is deformed by heating above the first threshold temperature or cooling below the second threshold temperature.

In certain embodiments, the fiber sleeve may have a bellows design to facilitate expansion and contraction.

Preferably, the fiber sleeve is attached to one or both of the first and second support elements by an adhesive.

In some embodiments, the first end of the SMA element is connected to a first support element and the second end of the SMA element is connected to a second support element. In this embodiment, when the SMA element is heated above the first threshold temperature, the SMA element deforming causes the SMA element to exert a force on a biased moveable element, causing the moveable element to move relative to the first and second support elements. Similarly, when the SMA element is subsequently cooled below the second threshold temperature, the SMA element deforming causes the SMA element to decrease the force exerted on the moveable element by the SMA element, allowing the moveable element to move relative to the first and second support elements due to the biasing.

BRIEF DESCRIPTION OF THE DRAWINGS

FIG. 1a shows the SMA wires before activation.

FIG. 1b shows the SMA wires after activation. FIGS. 1c and 1d show the SMA wires after activation and where the wires are partially recovered.

FIG. 2 is a cut-away side view of an embodiment of a combination of an SMA element and a fiber sleeve.

FIG. 3a shows the SMA wires before activation. FIG. 3b shows the SMA wires after activation.

DETAILED DESCRIPTION OF THE INVENTION

Figure 1:
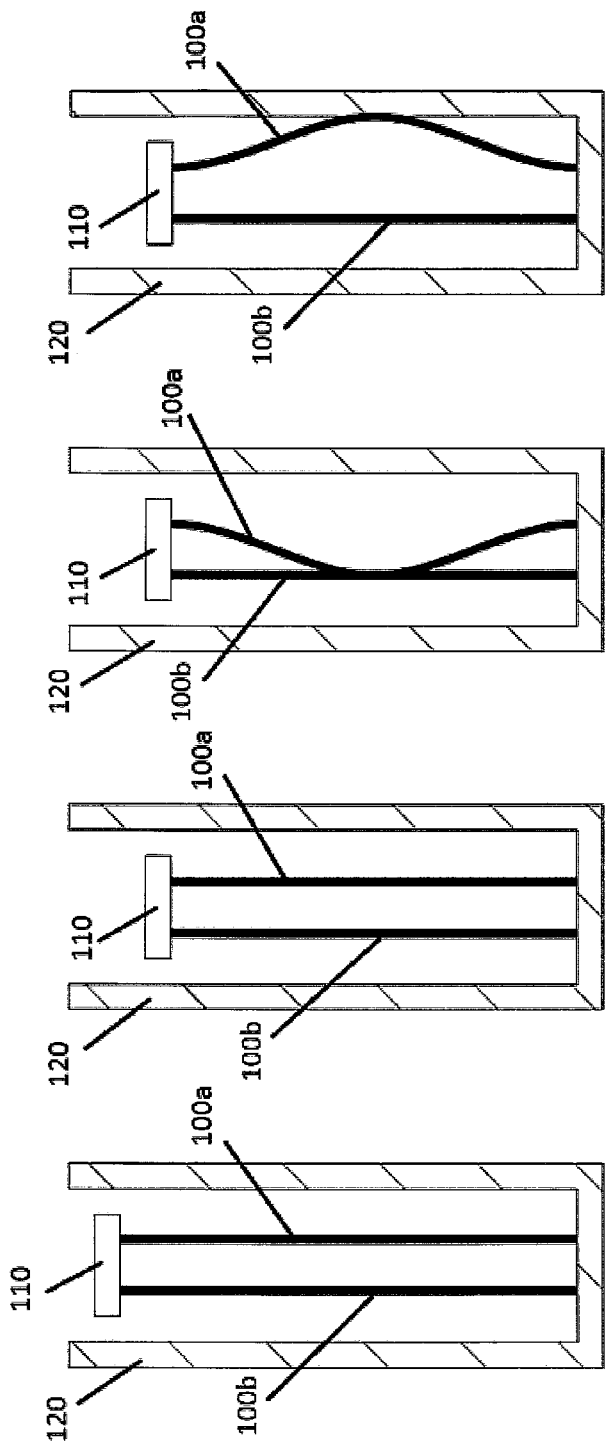
FIGS. 1a, 1b, 1c and 1d are cross-sectional views of two SMA wires.

An embodiment of a combination 200 of an SMA element 210 and a fiber sleeve 220 is shown in FIG. 2. The SMA element 210 comprises SMA. The SMA may be a copper-aluminium-nickel or nickel-titanium (NiTi) alloy, although other materials, such as alloys of zinc, copper, gold and iron, may be used. The SMA element 210 may be a wire comprising SMA, as shown in FIG. 2. Alternatively, the SMA element may be a tape, ribbon, tube, spring, or other elongated shape comprising SMA.

SMA element 210 extends from a first end to a second end. The first end is connected to first support element 280 and the second end is connected to second support element 270, wherein first and second support elements 280 and 270 are moveable relative to each other. SMA element 210 may, for example, be connected to the first and second support elements 280 and 270 by the use of crimps 230 and 240, respectively, however, the skilled person will understand that other connection means may be used. As the skilled person will appreciate, all that is required for a connection is that SMA element 210 be able to exert force and/or torque on the first and second support elements 280 and 270 through the connection. In some embodiments, the connection may also double as an electrical conductor that electrically connects SMA element 210 to an electric circuit, permitting SMA element 210 to undergo Joule heating.

Fiber sleeve 220 is an electrically insulating sleeve made of a flexible fiber material. The flexible fiber material is selected so that fiber sleeve 220 can withstand the temperature of the deformed SMA element 210 when it is heated. Fiber sleeve 220 may comprise fiberglass. Alternatively, fiber sleeve 220 may comprise at least one of polyethylene terephthalate (PET) fibers, aramid fibers (such as Kevlar), or nylon fibers. Fiber sleeve 220 may be provided with end fraying prevention means, such as a coating or a ring. For example, a metal ring or a plastic ring that may be molded onto the end of the fiber sleeve may be used (not shown). Alternatively, the end of a sleeve, such as a sleeve comprising PET, can be melted down and resolidified to prevent fraying.

In certain embodiments, fiber sleeve 220 is coated to provide an impermeable membrane which prevents electrical leakage current flow in conductive environments. The coating may comprise an acrylic polymer, a silicone polymer, a vinyl polymer, or any combination thereof.

In other embodiments, fiber sleeve 220 remains uncoated to provide a permeable membrane that increases the heat transfer into the surrounding environment. The surrounding environment may be a liquid, such as an oil. The liquid may act as a heat sink, allowing SMA element 210 to cool more quickly than if it were in air, and thereby decrease recovery time of SMA element 210. It is desirable for an uncoated fiber sleeve 220 to have fibers that are dense enough to prevent SMA element 210 from protruding through fiber sleeve 220 in order to provide adequate electrical isolation. In addition, an uncoated fiber sleeve 220 preferably has an adequate dielectric strength to prevent the flow of current between the SMA element 210 and its surroundings.

The fibers of fiber sleeve 220 may be woven or braided. Preferably the fibers are closely woven or braided so as to prevent SMA element 210 from protruding through fiber sleeve 220 in order to provide adequate electrical isolation. In certain embodiments (not shown), the fiber sleeve may have a bellows or corrugated design to facilitate expansion and contraction. In some embodiments, the volume of the interior region of fiber sleeve 220 can be maintained relatively constant when the length of fiber sleeve 220 decreases by having the diameter of fiber sleeve 220 increase at the same time. This permits fiber sleeve 220 to be filled with a medium such as dielectric grease that can provide desired thermal and electrical properties.

Fiber sleeve 220 is sized to accommodate SMA element 210 in the interior region of fiber sleeve 220 so that fiber sleeve 220 surrounds at least a portion of SMA element 210. Fiber sleeve 220 can be factory installed or provided in pre-cut sections that can be slipped over SMA element 210 during assembly.

Fiber sleeve 220 can, for example, surround one or more SMA elements. In the embodiment shown in FIG. 2, fiber sleeve 220 is sized to accommodate a single SMA element 210 in the interior region of fiber sleeve 220.

In another embodiment having more than one SMA element (not shown), the SMA elements may be arranged in parallel to one another. The SMA elements may be spaced out in an array, or may be bundled together. In such embodiments, the fiber sleeve has an inner diameter dimensioned to accommodate the arrangement of elements so that the elements can be placed together in the interior region of the fiber sleeve. For example, there may be two SMA wires having substantially equal outer diameters, and the fiber sleeve may have an inner diameter that is at least twice the outer diameter of each SMA wire. In certain embodiments, where the interior region of the fiber sleeve has a diameter that is at least two times the outer diameter of the SMA wires, a broken SMA wire tends to slide along the other SMA wire when actuated. Sliding decreases the stress on the fiber sleeve, since the broken SMA wire will be less likely to buckle and go out of plane.

In yet another embodiment (also not shown), a first SMA wire in a first fiber sleeve can be run inside a second fiber sleeve surrounding a second SMA wire, providing a loose, i.e. compliant, mechanical coupling of both wires.

As shown in FIG. 2, fiber sleeve 220 may extend from a position proximate to first support element 280 to a position proximate to second support element 270. Alternatively, the fiber sleeve may surround the entirety of the one or more SMA elements (not shown).

In some embodiments, the fiber sleeve is secured to the SMA element proximate to the first end or is attached to the first support element. The fiber sleeve may also be secured to the SMA element proximate to the second end or is secured to the second support element. The fiber sleeve may be secured by the use of adhesive or mechanical means, such as a crimp connection or retaining ring. The use of an adhesive tends to prevent fraying of the ends of the fiber sleeve. An adhesive can provide a strong bond where the fiber sleeve is made of woven or braided fibers.

For example, as shown in FIG. 2, fiber sleeve 220 may be secured to SMA element 210 by a common crimp connection. First support element 280 may, for example, be in the form of a ring terminal having a two-piece crimp, crimps 230 and 250, used to crimp SMA element 210 and fiber sleeve 220, respectively. Also as shown in FIG. 2, fiber sleeve 220 may be secured to second support element 270 by use of an adhesive 260.

One or both ends of the fiber sleeve may remain unattached to either the SMA element or a support element (not shown). For example, the fiber sleeve may be dimensioned such that it remains in a compressed state whether the SMA element is deformed by heating or cooling. The compressed fiber sleeve uses its own spring force to push itself against one or both of the first and second support elements.

In use, when SMA element 210 is heated above a first threshold temperature by, for example, running a current through SMA element 210, SMA element 210 deforms. This causes first and second support elements 280 and 270 to move relative to each other. In turn, fiber sleeve 220 deforms and continues to surround the portion of SMA element 210. In certain embodiments, when SMA element 210 is heated above the first threshold temperature, SMA element 210 contracts or twists, causing first and second support elements 280 and 270 to move towards each other. Fiber sleeve 220 also contracts or twists and continues to surround the portion of SMA element 210.

When SMA element 210 is subsequently cooled below a second threshold temperature SMA element 210 deforms, causing the first and second support elements 280 and 270 to move relative to each other. In turn, fiber sleeve 220 deforms and continues to surround the portion of SMA element 210. In certain embodiments, when SMA element 210 is cooled below the second threshold temperature SMA element 210 expands or untwists, causing first and second support elements 280 and 270 to move away from each other. Fiber sleeve 220 also expands or untwists and continues to surround the portion of SMA element 210.

Combination 200 is particularly suitable for use in an environment with surrounding electrical conductors (not shown) so that when SMA element 210 undergoes Joule heating and is at a voltage potential higher than the surrounding electrical conductors, fiber sleeve 220 inhibits the flow of electric current from SMA element 210 to its surroundings.

Because fiber sleeve 220 is an electrically insulating sleeve, it tends to provide personal shock protection as well as protection against shorting. In addition, fiber sleeve 220 tends to support SMA element 210 in case of breakage, whether mid-length or near the ends of SMA element 210, thereby inhibiting the flow of electric current from SMA element 210 to its surroundings.

Figure 3A:
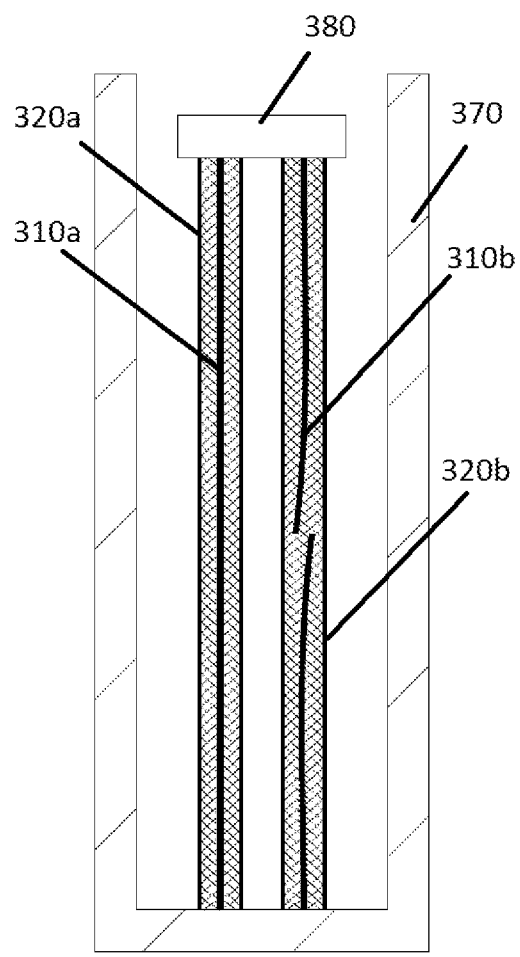
FIGS. 3a and 3b are cross-sectional views of two SMA wires supported by fiber sleeves, with one of those SMA wires being broken.
Figure 3B:
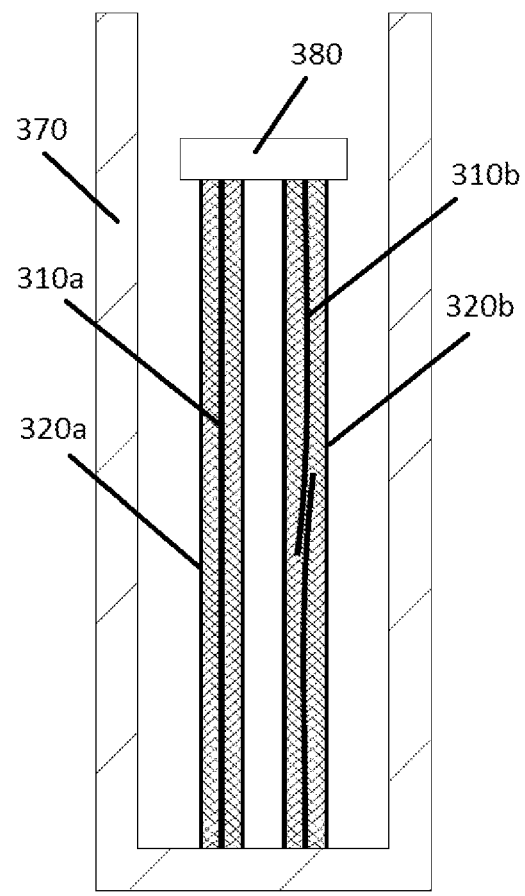

This can, for example, be seen in FIGS. 3a and 3b, where SMA wires 310a and 310b are supported by fiber sleeves 320a and 320b, respectively, and are connected to first and second support elements 380 and 370. Fiber sleeve 320b supports broken SMA wire 310b both before and after activation, as seen in FIGS. 3a and 3b, respectively.

Figure 4:
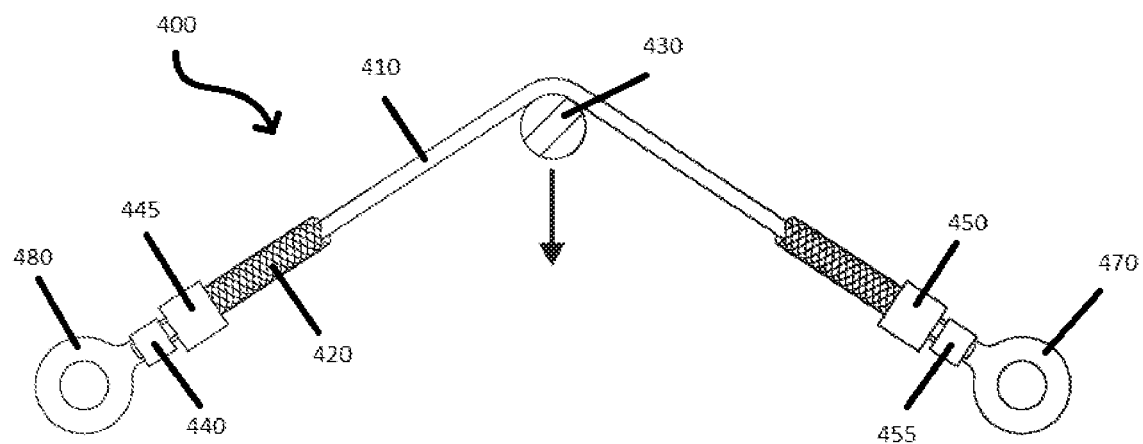
FIG. 4 is a cut-away side view of a further embodiment of a combination of an SMA element and a fiber sleeve.

Combination 400 of an SMA element 410 and a fiber sleeve 420 is shown in FIG. 4. SMA element 410 comprises SMA similar to the SMA forming SMA element 210. SMA element 410 is connected at one end to first support element 480 (by, for example, use of crimp 440) and at the other end to second support element 470 (by, for example, use of crimp 455). Alternatively (not shown), the first and second support elements may be the same, such that the SMA element is looped and connects at each end to the same support element. Fiber sleeve 420 is similar to fiber sleeve 220, and may, for example, be secured to SMA element 410 by crimps (such as crimps 445 and 450). Moveable element 430 is biased (this can be done, for example, by use of a spring or by a weight) and positioned proximate to SMA element 410.

In use, when SMA element 410 is heated above a first threshold temperature by, for example, running a current through SMA element 410, SMA element 410 deforms (for example, by contracting). This causes SMA element 410 to exert a force on moveable element 430. This counteracts the biasing and causes moveable element 430 to move relative to first and second support elements 480 and 470 (moveable element 430 may, for example, move in a direction as shown by the arrow in FIG. 4). In turn, fiber sleeve 420 deforms and continues to surround the portion of SMA element 410.

When SMA element 410 is subsequently cooled below a second threshold temperature SMA element 410 deforms (for example, by expanding). This decreases the force exerted on moveable element 430 by SMA element 410, and allows moveable element 430 to move back towards its original position relative to the first and second support elements 480 and 470. In turn, fiber sleeve 420 deforms and continues to surround the portion of SMA element 410.

In still another embodiment (not shown), instead of a fiber sleeve, the SMA element may be embedded in a compliant, spongy material that supports broken SMA elements and can withstand the temperature of deformed SMA elements when they are heated, such as an open or closed cell foam. The spongy material may, for example, be injected, post-assembly, into a device containing the SMA element, and permitted to expand around the SMA element.

It should be understood that the above-described embodiments of the present invention, particularly, any "preferred" embodiments, are only examples of implementations, merely set forth for a clear understanding of the principles of the invention. Many variations and modifications may be made to the above-described embodiment(s) of the invention as will be evident to those skilled in the art. That is, persons skilled in the art will appreciate and understand that such modifications and variations are, or will be, possible to utilize and carry out the teachings of the invention described herein.

Where, in this document, a list of one or more items is prefaced by the expression "such as" or "including", is followed by the abbreviation "etc.", or is prefaced or followed by the expression "for example", or "e.g.", this is done to expressly convey and emphasize that the list is not exhaustive, irrespective of the length of the list. The absence of such an expression, or another similar expression, is in no way intended to imply that a list is exhaustive. Unless otherwise expressly stated or clearly implied, such lists shall be read to include all comparable or equivalent variations of the listed item(s), and alternatives to the item(s), in the list that a skilled person would understand would be suitable for the purpose that the one or more items are listed.

The words "comprises" and "comprising", when used in this specification and the claims, are used to specify the presence of stated features, elements, integers, steps or components, and do not preclude, nor imply the necessity for, the presence or addition of one or more other features, elements, integers, steps, components or groups thereof.

The scope of the claims that follow is not limited by the embodiments set forth in the description. The claims should be given the broadest purposive construction consistent with the description and figures as a whole.

What is claimed is:

1. A combination of a shape-memory alloy (SMA) element and a fiber sleeve, the SMA element comprising a SMA extending from a first end to a second end, the fiber sleeve comprising an electrically insulating sleeve made of flexible fiber material and having an interior region, the fiber sleeve being sized to accommodate the SMA element in the interior region so that the sleeve surrounds at least a portion of the SMA element, wherein when the SMA element is heated above a first threshold temperature, the SMA element deforms, and the fiber sleeve deforms and continues to surround the portion of the SMA element, and wherein when the SMA element is subsequently cooled below a second threshold temperature the SMA element deforms, and the fiber sleeve deforms and continues to surround the portion of the SMA element, wherein the combination is configured for use in an environment with surrounding electrical conductors so that when the SMA element undergoes Joule heating and is at a voltage potential higher than the surrounding electrical conductors, the fiber sleeve inhibits the flow of electric current from the SMA element to its surroundings, wherein the flexible fiber material is selected so that the fiber sleeve can withstand the first threshold temperature.

2. The combination of claim 1, wherein a first position along a length of the SMA element is connected to a first element and a second position along the length of the SMA element is connected to a second element, the first and second elements moveable relative to each other, and wherein when the SMA element is heated above the first threshold temperature, the SMA element deforming causes the first and second elements to move relative to each other, and when the SMA element is subsequently cooled below the second threshold temperature, the SMA element deforming causes the first and second elements to move relative to each other.

3. The combination of claim 1, wherein the first end of the SMA element is connected to a first support element and the second end of the SMA element is connected to a second support element, the first and second support elements moveable relative to each other, and wherein when the SMA element is heated above the first threshold temperature, the SMA element deforming causes the first and second support elements to move relative to each other, and when the SMA element is subsequently cooled below the second threshold temperature, the SMA element deforming causes the first and second support elements to move relative to each other.

4. The combination of claim 3, wherein the fiber sleeve is either secured to the SMA element proximate to the first end or is attached to the first support element, and fiber sleeve is also either secured to the SMA element proximate to the second end or is secured to the second support element.

5. The combination of claim 4, wherein the fiber sleeve is secured to the SMA element proximate to the first end by a common crimp connection.

6. The combination of claim 5, wherein the fiber sleeve is secured to the second support element.

7. The combination of claim 3, wherein the fiber sleeve surrounds the SMA element and extends from a position proximate to the first support element to a position proximate to the second support element.

8. The combination of claim 7, wherein the SMA element is a wire made of the SMA.

9. The combination of claim 8 further comprising a second wire made of the SMA, wherein the two wires have substantially equal outer diameters, and wherein the fiber sleeve has an inner diameter that is at least twice the outer diameter of each wire so that the two wires can be placed in the interior region of the fiber sleeve together and the fiber sleeve surrounds the two wires and extends from a position proximate to the first support element to a position proximate to the second support element.

10. The combination of claim 8 further comprising one or more additional wires made of the SMA, wherein all the wires are in an arrangement that is parallel to one another, and wherein the fiber sleeve has an inner diameter dimensioned to accommodate the arrangement of the wires so that the wires can be placed together in the interior region of the fiber sleeve and the fiber sleeve surrounds the wires and extends from a position proximate to the first support element to a position proximate to the second support element.

11. The combination of claim 3, wherein the fiber sleeve comprises closely woven or braided fiberglass.

12. The combination of claim 3, wherein the fiber sleeve is coated to provide an impermeable membrane which prevents electrical leakage current flow in conductive environments.

13. The combination of claim 12, wherein the coating comprises an acrylic polymer, a silicone polymer or a vinyl polymer.

14. The combination of claim 3, wherein the fiber sleeve is uncoated to provide a permeable membrane that increases the heat transfer into surrounding environments.

15. The combination of claim 4, wherein when the SMA element is heated above the first threshold temperature, the SMA element contracts, causing the first and second support elements to move axially towards each other, and the fiber sleeve contracts and continues to surround the portion of the SMA element, and wherein when the SMA element is subsequently cooled below the second threshold temperature the SMA element expands, causing the first and second support elements to move axially away from each other, and the fiber sleeve expands and continues to surround the portion of the SMA element.

16. The combination of claim 3, wherein, if the SMA element breaks, the fiber sleeve supports the broken SMA element and continues to inhibit the flow of electric current from the SMA element to its surroundings.

17. The combination of claim 3, wherein the fiber sleeve comprises at least one of polyethylene terephthalate fibers, aramid fibers and nylon fibers.

18. The combination of claim 3, wherein the fiber sleeve comprises end fraying prevention means.

19. The combination of claim 3, wherein the fiber sleeve is dimensioned such that it remains in a compressed state whether the SMA element is deformed by heating above the first threshold temperature or cooling below the second threshold temperature.

20. The combination of claim 3, wherein the fiber sleeve comprises a bellows design to facilitate expansion and contraction.

21. The combination of claim 4, wherein the fiber sleeve is attached to one or both of the first and second support elements by an adhesive.

22. The combination of claim 1, wherein the first end of the SMA element is connected to a first support element and the second end of the SMA element is connected to a second support element, when the SMA element is heated above the first threshold temperature, the SMA element deforming causes the SMA element to exert a force on a biased moveable element, causing the moveable element to move relative to the first and second support elements, and when the SMA element is subsequently cooled below the second threshold temperature, the SMA element deforming causes the SMA element to decrease the force exerted on the moveable element by the SMA element, allowing the moveable element to move relative to the first and second support elements due to the biasing.

\* \* \* \* \*